(12) United States Patent
Dyrbusch et al.

(10) Patent No.: US 8,756,920 B2
(45) Date of Patent: Jun. 24, 2014

(54) PROCEDURE AND DEVICE FOR THE INCREASE IN VALUE OF ONE DOSE ARRANGEMENT

(75) Inventors: Damian Dyrbusch, Ludwigsburg (DE); Ignacio Garcia-Lorenzana Merino, Brussels (BE); Markus Boerner, Filderstadt-Bernhausen (DE); Natalie Kuestner, Stuttgart (DE)

(73) Assignee: Robert Bosch GmbH, Stuttgart (DE)

( * ) Notice: Subject to any disclaimer, the term of this patent is extended or adjusted under 35 U.S.C. 154(b) by 486 days.

(21) Appl. No.: 12/548,150

(22) Filed: Aug. 26, 2009

(65) Prior Publication Data
US 2010/0050612 A1 Mar. 4, 2010

(30) Foreign Application Priority Data
Aug. 27, 2008 (DE) .......................... 10 2008 041 612

(51) Int. Cl.
*F01N 3/00* (2006.01)
*G01L 27/00* (2006.01)
*G01M 13/02* (2006.01)
*G01M 15/00* (2006.01)
*G01N 7/20* (2006.01)
*G01N 7/22* (2006.01)

(52) U.S. Cl.
USPC .............. 60/295; 60/286; 60/303; 137/614.2; 73/169; 73/114.45; 73/114.51; 73/114.79; 73/1.72

(58) Field of Classification Search
USPC ........ 137/614.2, 98; 60/286, 295, 303; 73/16, 73/114.45, 114.51, 9, 1.72, 114.79; 701/33.8, 33.9
See application file for complete search history.

(56) References Cited

U.S. PATENT DOCUMENTS

| | | | |
|---|---|---|---|
| 6,273,120 B1 * | 8/2001 | Hofmann et al. | 137/98 |
| 6,301,879 B1 * | 10/2001 | Weisweiler et al. | 60/274 |
| 7,472,689 B2 * | 1/2009 | Ishizuka et al. | 123/446 |
| 7,481,049 B2 * | 1/2009 | Huber et al. | 60/324 |
| 2006/0065242 A1 * | 3/2006 | Nagai | 123/458 |
| 2006/0168941 A1 * | 8/2006 | Pfaeffle et al. | 60/274 |
| 2007/0234709 A1 * | 10/2007 | Bork | 60/282 |
| 2008/0006245 A1 * | 1/2008 | Casarella et al. | 123/479 |

(Continued)

FOREIGN PATENT DOCUMENTS

| | | |
|---|---|---|
| DE | 10 2004 061 247 | 6/2006 |
| WO | WO 2007012512 A1 * | 2/2007 |
| WO | WO 2007034097 A2 * | 3/2007 |

OTHER PUBLICATIONS

English Translation of DE102004061247.*

*Primary Examiner* — Thomas Denion
*Assistant Examiner* — Anthony Ayala Delgado
(74) *Attorney, Agent, or Firm* — Kenyon & Kenyon LLP

(57) ABSTRACT

The invention concerns a procedure for controlling a metering device for metering fuel into the exhaust gas duct of a combustion engine for the regeneration of a particle filter, whereby the metering device supplies the fuel to the exhaust gas duct over a security valve, a first fuel pipe, a metering valve, a second fuel pipe and an injection check valve and whereby the pressure of the fuel is determined between the metering valve and the injection check valve in the second fuel pipe. It is thereby provided that an opening pressure of the injection check valve is determined from the pressure course between the metering valve and the injection check valve.

10 Claims, 3 Drawing Sheets

(56) References Cited

U.S. PATENT DOCUMENTS

| | | | |
|---|---|---|---|
| 2008/0245058 A1* | 10/2008 | Boddy et al. | 60/286 |
| 2008/0319584 A1* | 12/2008 | Fischer et al. | 700/282 |
| 2009/0188239 A1* | 7/2009 | Ploton et al. | 60/286 |
| 2009/0255234 A1* | 10/2009 | Haeberer et al. | 60/295 |

* cited by examiner

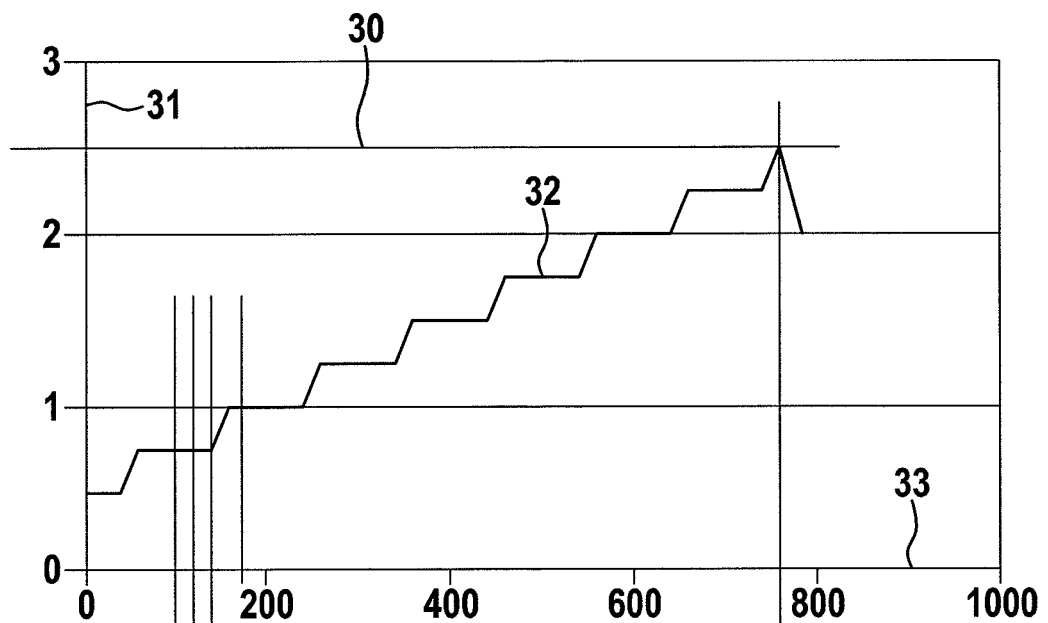
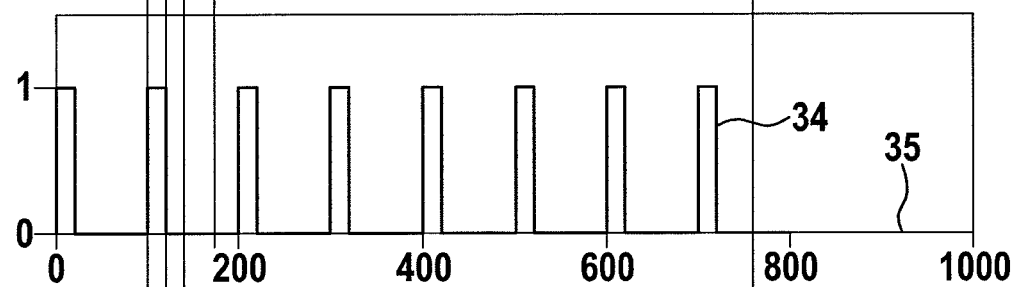
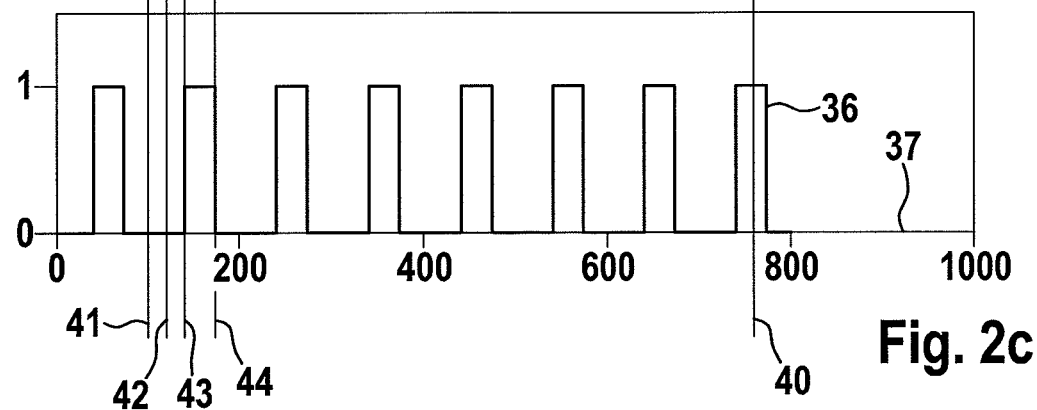
Fig. 2a
Fig. 2b
Fig. 2c

PROCEDURE AND DEVICE FOR THE INCREASE IN VALUE OF ONE DOSE ARRANGEMENT

This application claims benefit of Serial No. 10 2008 041 612.6, filed 27 Aug. 2008 in Germany and which application is incorporated herein by reference. To the extent appropriate, a claim of priority is made to the above disclosed application.

TECHNICAL FIELD

The invention concerns a procedure for controlling a metering device for metering fuel into the exhaust gas duct of a combustion engine for the regeneration of a particle filter, whereby the metering device supplies the fuel to the exhaust gas duct over a security valve, a first fuel pipe, a metering valve, a second fuel pipe and an injection check valve and whereby the pressure of the fuel is determined between the metering valve and the injection check valve in the second fuel pipe.

The invention furthermore concerns a device for determining the opening pressure of an injection check valve, whereby the first injection check valve is a part of a metering device for supplying fuel into the exhaust gas duct of a combustion engine for regenerating a particle filter, whereby the fuel is supplied to the exhaust gas over a security valve, a first fuel pipe, a metering valve, a second fuel pipe and the injection check valve, whereby a pressure gauge is provided for determining the fuel pressure in the second fuel pipe and whereby a control electronic is provided for controlling the metering device.

BACKGROUND

For the regeneration of particle filters in the exhaust gas of combustion engines fuel is injected into the exhaust gas duct of the combustion engine before an oxidization catalyzer and catalytically combusted in that oxidization catalyzer. Thereby the temperature of the exhaust gas is increased so far until the burn-off temperature of the particles that are accumulated in the downstream built-in particle filter is achieved. The particles are then combusted in an exothermal reaction.

For metering fuel into the exhaust gas duct first fuel is supplied to a metering valve over a security valve that is under pressure. Therefore the security valve is completely opened. The metering of the required fuel quantity takes place over the metering valve, which is controlled continuously or correspondingly cycled.

Due the high temperature in the exhaust gas duct the metering valve cannot be attached directly at the exhaust gas duct. Therefore an injection check valve is provided, over which the fuel is injected into the exhaust gas duct coming from the metering valve.

The calculation of the metering quantity takes place with the aid of a pressure measurement between the security valve and the metering valve. A second pressure measurement is provided between the metering valve and the injection valve and serves for the leakage detection in the metering device.

DE 10 2004 061 247 A1 describes a procedure for operating a combustion engine, in whose exhaust gas area an exhaust gas treatment device is arranged, at which a reagent is inserted into the exhaust gas area upstream before the exhaust gas treatment device, at which in the streaming direction of the reagent, which is set to a default reagent swelling pressure (pQRea), first a switchable reagent security valve (ReaCV), then a continuous reagent metering valve (ReaDV) and then a reagent injection check valve (ReaIV) are arranged, at which the reagent pressure (pRea) in the reagent path is detected, which lies between the reagent security valve (ReaCV) and the reagent metering valve (ReaDV), at which the reagent pressure (pRea) that has been detected in at least one default state of the reagent security valve (ReaCV) and/or the reagent metering valve (reaDV) is compared with a threshold value (pU, pabg, dpReaIV, dpReaCV, pQRea, dpRea/dt) and at which an error signal (F) is provided at a threshold exceeding.

DE 10 2004 061 247 A1 furthermore describes a device for operating a combustion engine. It is thereby provided that at least one control unit that is customized for implementing the procedure is provided.

Procedure and device enable the detection of a leakage in the reagent path as well as the checking of the function of the valves that are arranged in the reagent path.

The disadvantage of the familiar procedures and devices is that the metering accuracy of the fuel into the exhaust gas duct depends on tolerances of the injection check valve and is correspondingly limited.

It is the task of the invention to provide a procedure and a device, which improve the metering accuracy of the fuel metering into the exhaust gas duct.

SUMMARY

The task of the invention that concerns the procedure is thereby solved, in that an opening pressure of the injection check valve is determined from the pressure course between the metering valve and the injection check valve.

During the metering process of fuel into the exhaust gas duct initially the pressure of the fuel between the metering valve and the injection check valve increases so far until the injection check valve opens the first time during the metering process. If the injection check valve opens, this changes the pressure course between the metering valve and the injection check valve. This change is determined by a corresponding evaluation electronic with the aid of the pressure that is measured between the metering valve and the injection check valve and assigned to the fuel pressure that is present at this point of time.

The fuel pressure that is present during the opening of the injection check valve is directly connected to the opening pressure of the injection check valve. The opening pressure of the present injection check valve can thus be determined and considered at the controlling of the metering device or at the diagnosis of errors in the metering device. Because the opening pressure of the injection check valve influences the metering quantity of the fuel that is supplied to the exhaust gas duct, the metering quantity of the fuel metering in the exhaust gas duct can be improved thereby on the one hand, on the other hand injection check valves can be used with a higher manufacturing tolerance regarding the opening pressure, which enables an inexpensive manufacturing of the injection check valve.

The evaluation of the fuel pressure at the first opening of the injection check valve is advantageous during a metering process, because the fuel pressure between the metering valve and the injection check valve have a value above the one of the opening pressure of the injection check valve during the later metering period due to the pressure drop over the injection check valve that depends on the metering quantity.

An improvement of the accuracy of the determined opening pressure can thereby be achieved, in that operating parameters of the combustion engine are considered at the determination of the opening pressure of the injection check valve. Thus for example the momentary present exhaust gas pressure has an influence, at which fuel pressure opens the injection check valve and can be correspondingly considered at the determination of the opening pressure of the injection check valve.

According to a particularly preferred embodiment of the invention it can be provided, that the opening pressure of the injection check valve is thereby determined, in that the security valve and the metering valve are opened alternately at least until the first opening of the injection check valve, so that the pressure of the fuel between the metering valve and the injection check valve increases stepwise and so that the opening pressure of the injection check valve is assumed from the maximally occurring pressure of the fuel.

At an opened security valve and closed metering valve the pressure in the first fuel pipe increases between the two valves on to the supply pressure of the fuel. That can typically lie at 4 to 8 bar, if the fuel is taken from the low-pressure cycle of the fuel supply system of the combustion engine. If subsequently the security valve is closed and then the metering valve opened, a pressure balancing takes place between the first fuel pipe, thus the area between the security valve and the metering valve, and the second fuel pipe and thus the area between the metering valve and the injection check valve. The fuel pressure between the metering valve and the injection check valve increases depending on the pressure and the volume of the previously enclosed fuel between the security valve and the metering valve and depending on the volume and the pressure in the second fuel pipe. If after the pressure balancing the metering valve is closed and then the security valve opened, fuel with an increased pressure gets again in the area between the security valve and the metering valve. This process is repeated periodically. Thereby the pressure increases stepwise in the second fuel pipe before the injection check valve. The height of the pressure steps depends on the pressure and volume relations in the fuel pipes as well as on the pressure of the supplied fuel from the low-pressure cycle.

The stepwise approximating of the fuel pressure to the opening pressure of the injection check valve enable a very accurate determination of the opening pressure, because the idleness of the opening valve, which causes a delayed opening of the injection check valve at a quick increase of the fuel pressure, has only a slight influence.

It is provided that the time between the closing of the security valve and the opening of the metering valve and the time of the closing of the metering valve and the opening of the security valve is preset, so that the speed, with which the fuel pressure approximates stepwise the opening pressure of the injection check valve, can be preset. Thereby an optimal fuel increase can be adjusted with regard to a possible accuracy and required time for the determination of the opening pressure of the injection check valve.

It can be provided in an alternative embodiment that the time between the opening and closing of the security valve and the time between the opening and closing of the metering valve are preset.

A further preferred embodiment of the invention provides that the opening pressure of the injection check valve is thereby determined that the security valve and the metering valve are opened simultaneously and that the opening pressure of the injection check valve is assumed from the first maximum of the pressure of the fuel.

If the security valve and the metering valve are both completely opened, the fuel pressure in the second fuel pipe will increase continuously depending on the volume of the fuel pipes, the streaming resistances and the supply pressure of the fuel. As soon as the opening pressure of the injection check valve is reached, the fuel pressure in the second fuel pipe will sink due to the fuel that is delivered to the exhaust gas duct.

The maximum of the fuel pressure that occurs is connected with the opening pressure of the injection check valve. The opening of the injection check valve can thus be determined very fast without a cycled controlling of the security valve.

It can be provided that the determination of the opening pressure of the injection check valve takes place during the regularly regenerating operation of the particle filter or during a diagnosis cycle or during the rinse operation of the metering device.

The metering accuracy of the fuel in the exhaust gas duct of the combustion engine can thereby be significantly improved, in that the opening pressure of the injection check valve is considered at the quantity calculation for metering the fuel.

For checking the function of the injection check valve it can be provided that the pressure of the fuel is compared to a first threshold value and that when exceeding the first threshold value a defect injection check valve is assumed. An injection check valve that jams in closed state will not open or only at a high fuel pressure.

An injection check valve that for example jams in opened state or a leakage in the metering device can thereby be determined, in that the maximally occurring pressure of the fuel is compared to a second threshold value and that a defect injection check valve is assumed and/or a leakage, if the maximally occurring pressure of the fuel falls below the second threshold value.

The task of the invention that concerns the procedure is thereby solved, in that a tracker is provided in the control electronic for determining a maximum in the pressure course of the fuel in the second control pipe. The tracker allows to determine the first maximum of the pressure during the increasing phase of the fuel pressure before the injection check valve. This maximum is directly connected with the opening pressure of the injection check valve, so that the opening pressure of the injection check valve can be determined thereof.

It can hereby be provided, that a program is provided in the control electronic for an alternative opening and closing of the security valve and the metering valve or for a simultaneous opening of the security valve and the metering valve during a diagnosis cycle. By the alternative opening and closing of the security valve and the metering valve a fuel pressure is achieved before the injection check valve that is increasing in defined steps, while the simultaneous opening of the security valve and the metering valve causes a continuous increase of the fuel pressure before the injection check valve.

BRIEF DESCRIPTION OF THE DRAWINGS

The invention is further explained in the following with the aid of the embodiments that are illustrated in the figures. It is shown in:

FIGS. 2a to 2c show a first pressure course at an alternating controlling of a security valve and a metering valve.

DETAILED DESCRIPTION

Figure 1:
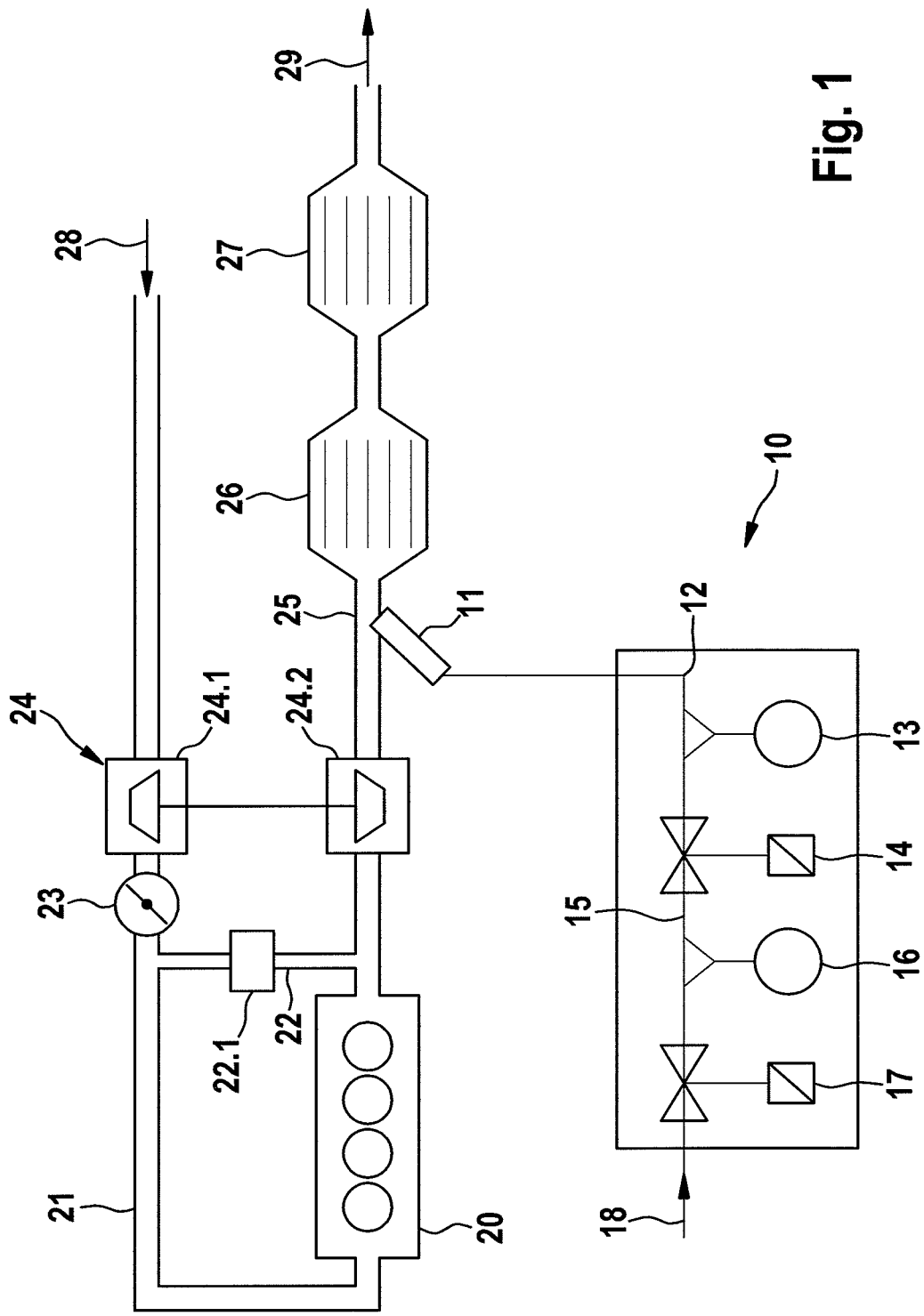
FIG. 1 shows schematically an illustration of a combustion engine with a metering device for metering fuel into an exhaust gas duct of the combustion engine.

FIG. 1 schematically shows a combustion engine 20 with a metering device 10 for metering fuel into an exhaust gas duct 25 of the combustion engine 20 in an illustration. The illustration is thereby limited to the components that are required for explaining the invention. The combustion engine 20 is construed in the form of a diesel engine with an air supply duct 21, into which a supply air flow 28 is delivered, and the exhaust duct 25, into which an exhaust gas current 29 of the combustion engine 20 is delivered. A compression step 24.1 of a turbo charger 24 and a throttle valve 23 are arranged in streaming direction of the supply air flow 28 along the supply air duct 21. An exhaust gas recirculation 22 connects the supply air duct 21 with the exhaust gas 25 over an exhaust gas recirculation valve 22.1. An exhaust gas turbine 24.2 of the turbo charger 24 as well as an oxidization catalyzer 26 in the form of a diesel oxidization catalyzer and a particle filter 27 in the form of a diesel particle filter as components of an exhaust gas after-treatment system are shown in streaming direction of the exhaust gas current 29 after the combustion engine 10.

The exhaust gas duct 25 is assigned to the metering device 10 for delivering fuel to the exhaust gas duct 25 before the oxidization catalyzer 26. Therein the fuel is supplied to a security valve 17, a metering valve 14 and finally an injection check valve 11 over a fuel metering 18 in streaming direction. A first fuel pipe 15 with a pressure gauge 16 is arranged between the security valve 17 and the metering valve 14 and a second fuel pipe 12 with a second pressure gauge 13 between the metering valve 14 and the injection check valve 11.

Not shown are control and regulation devices, temperature sensors as well as units for the load diagnosis of the particle filter, which are required for the operation of the combustion engine 20.

The combustion engine 20 is supplied with fresh air over the supply air duct 21. The fresh air is thereby compressed by the compression step 24.1 of the turbo charger 24, which is operated by the exhaust gas current 29 over the exhaust gas turbine 24.2. By the throttle valve 23 the supplied air quantity can be adjusted. For a pollution reduction the supply air flow 28 is admixed over the exhaust gas recirculation 22 to exhaust gas from the exhaust gas duct 25 in quantities that depend on the operating parameters of the combustion engine 20. The exhaust gas recirculation rate can thereby be adjusted with the aid of the exhaust gas recirculation valve 22.1.

In the exhaust gas after-treatment system pollutants that have been emitted by the combustion engine 20 are converted or filtered out. Thus hydrocarbons are oxidized in the oxidization catalyzer, while the particle filter 27 holds back soot particles.

By operating the combustion engine 20 the particle filter 20 is filling up until the reaching of its storage capacity is signalized. Thereupon a regeneration phase of the particle filter 27 is triggered, at which particles that are stored in the particle filter 27 are combusted in an exothermal reaction. In order to activate this exothermal reaction exhaust gas temperatures of 600° C. to 650° C. are required before the particle filter 27. Because these temperatures are achieved at a normal operation of the combustion engine 20 only close to full-load, a temperature increase has to be caused by additional measures. In particular in the case of low engine loads and engine speeds further measures, as for example in the area of the fuel injection, are necessary besides air system interferences, for example over the throttle valve 23. They can be measures within the engine like a late-shift of the main injection or an after-injection that is combusting in the combustion engine 20 in an engine speed neutral manner. Furthermore a change of the exhaust gas recirculation rate is possible over the exhaust gas recirculation valve 22.1.

A further possibility to increase the exhaust gas temperature before the particle filter 27 is to supply fuel to the exhaust gas duct 25 before the oxidization catalyzer 26 over the metering device 10 for activating and during a regeneration phase of the particle filter 27. The fuel is catalytically converted in the oxidization catalyzer 26, which causes a high warming of the exhaust gas current 29. The temperature increase can be regulated by the quantity of the metered fuel.

In order to meter fuel into the exhaust gas duct 25 of the combustion engine 20 the security valve 17 is first opened according to known procedures. The fuel flows then into the first fuel pipe 15. Mostly the fuel is taken from the low-pressure system of the fuel supply of the combustion engine 20 and thus provides a pressure of typically 4 to 8 bar. But it is also possible to build up the pressure by a separate fuel pump. The pressure of the fuel in the first fuel pipe 15 is determined by the first pressure gauge 16 and considered at the calculation of the necessary metering quantity.

The required quantity of fuel, which has to be supplied to the exhaust gas duct 25, is adjusted over the metering valve 14. Therefore the metering valve 14 is controlled continuously or cycled. The fuel gets into the second fuel pipe 12. The second pressure gauge 13 serves for the leakage detection in the second fuel pipe 12.

If the pressure of the fuel in the second fuel pipe 12 exceeds the opening pressure of the injection check valve 11, fuel is given to the exhaust gas duct 25 over the injection check valve 11.

The FIGS. 2a to 2c refer to the arrangement shown in FIG. 1 and show a first pressure course 32 at an alternating controlling of the security valve 17 and the metering valve 14.

The first pressure course 32 is registered in FIG. 2a compared to a first pressure axis 31 and a first time axis 33. The maximum in the first pressure course 32 is drawn in by a mark actuating pressure 30. The first pressure course 32 is equivalent to the pressure of the fuel, like it is determined by the second pressure gauge 13 as it is shown in FIG. 1.

FIG. 2b shows the switching state SV 34 of the security valve 17 compared to a second time axis 35 and FIG. 2c the switching state DV 36 of the metering valve 14 compared to a third time axis 37. A switching state of 1 means thereby an opened and a switching state of 0 a closed valve.

The time axis 33, 35, 37 are scaled equivalently so that a first point of time 41, a second point of time 42, a third point of time 43, a fourth point of time 44 and an actuating point of time 40 can be consistently marked for the three FIGS. 2a-2c.

A diagnosis cycle for determining the opening pressure of the injection check valve 11 is started with the opening of the security valve 17. According to the shown embodiment of the invention a periodical change takes place after that between the opened metering valve 14 and opened security valve 17, which is described for a period beginning with the first point of time 41 as follows:

At the first point of time 41 the security valve 17 is opened and at a second point of time 42 closed again. During this time the metering valve 14 remains closed. At a third point of time 43 the metering valve 14 is completely opened and at a fourth point of time 44 closed again. During this time the security valve 17 remains closed. In the time between the second point of time 42 and the third point of time 43 the security valve 17 and the metering valve 14 are closed.

Between the first point of time 41 and the second point of time 42 the not shown pressure of the fuel increases in the first fuel pipe 15 approximately on to the supply pressure of the fuel supply 18. This pressure remains after closing the security valve 17 at the second point of time 42. The first pressure course 32 of the fuel that is shown in FIG. 2a remains constant in the second fuel pipe 12 during this period of time, because the metering valve 14 is closed.

If the metering valve 17 is opened at the third point of time 43, a pressure balancing takes place between the first fuel pipe 15 and the second fuel pipe 12. As it is shown in FIG. 2a the pressure increases in the second fuel pipe 12 until the pressure balancing has taken place. After the reached pressure balancing the metering valve 14 is closed at the fourth point of time 44 and the cycle begins again with the next opening of the security valve 17.

By the alternating opening and closing of the security valve 17 and the metering valve 14 the pressure is increased stepwise in the second fuel pipe 12 before the injection check valve 11 by a defined and limited fuel volume, which exists between the security valve 17 and the metering valve 14. If the opening pressure of the injection check valve 11 is reached, the injection check valve 11 opens and releases a small quantity of fuel into the exhaust gas duct 25 of the combustion engine 20. This point is marked by the actuating pressure 30 and the actuating point of time 40. By the released fuel volume the fuel pressure sinks in the second fuel pipe 12. The maximum pressure, which results from the first pressure course, corresponds with the opening pressure of the injection check valve 11.

By the default of the periods of time, in which the security valve 17 and the metering valve 14 are closed, the increasing speed of the first pressure course 32 can be influenced. In order to reach the opening pressure of the injection check valve 11 as soon as possible these periods of time can be preset very short, so that the closing of the one valve takes place almost simultaneously with the opening of the other valve. A higher accuracy of the determination of the opening pressure of the injection check valve 11 is achieved with longer periods of time, in which both valves are closed.

Figure 3:
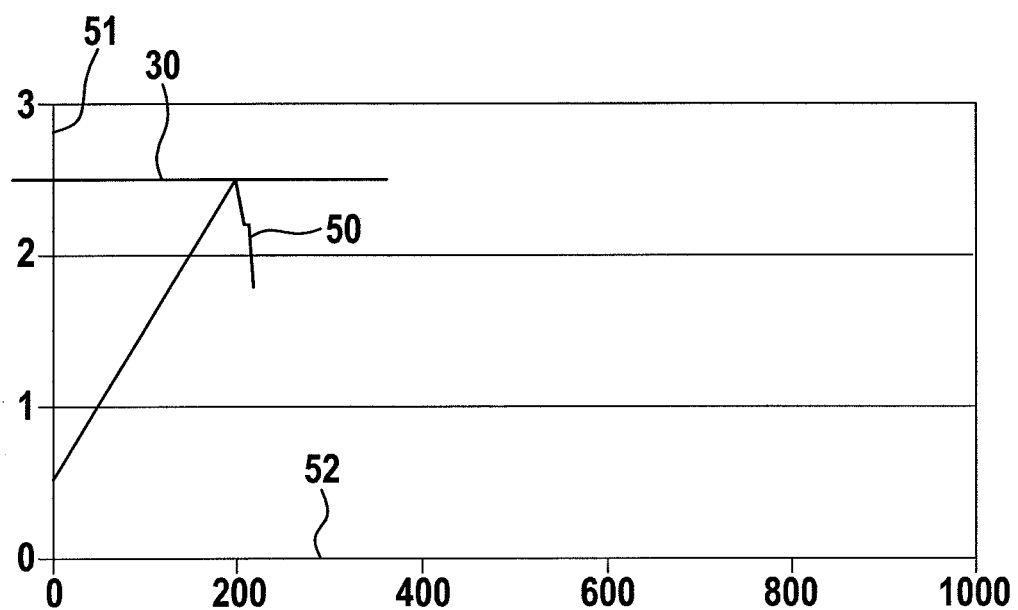
FIG. 3 shows a second pressure course at a simultaneous controlling of the security valve and the metering valve.

FIG. 3 shows a second pressure course 50 at a simultaneous controlling of the security valve 17 and the metering valve 14. The second pressure course 52 is thereby registered compared to a second pressure axis 51 and a fourth time axis 52. The actuating pressure 30 that is already shown in FIG. 2a is marked.

Alternatively to the embodiment that is shown in FIG. 2a-2c the security valve 17 and also the metering valve 14 are here simultaneously and completely opened at the point of time 0 at the beginning of a diagnosis cycle for determining the opening pressure of the injection check valve 11. Thereby the pressure increased in the second fuel pipe 12 before the injection check valve 11 according to the second pressure course 50. If the opening pressure of the injection check valve 11 is reached, the injection check valve 11 opens and releases a small quantity of fuel into the exhaust gas duct 25 of the combustion engine 20. Thereby the pressure of the fuel sinks in the second fuel pipe 12.

The maximum value of the second pressure course 50, marked by the actuating pressure 30, corresponds with the opening pressure of the injection check valve 11.

With the method that is shown in FIGS. 2a-2c as well as FIG. 3 the opening pressure of the injection check valve 11 can be determined. The alternating opening and closing of the security valve 17 and the metering valve 14 enable thereby an accurate determination of the opening pressure, while the simultaneous opening of the security valve 17 and the metering valve 14 enables a quick determination of the opening pressure at a reduced control and switch effort.

It is advantageously at the procedure that the determination of the opening pressure of the injection check valve 11 takes place on the basis of a second pressure gauge 13, which is provided anyway at metering devices 10 for metering fuel into the exhaust gas duct 25 of combustion engines 20.

The controlling of the metering device 10 takes place by a not shown control electronic. In this control electronic a program for the described controlling of the security valve 17 and the metering valve 14 can be put without a great effort. Furthermore the evaluation of the pressure signal of the second pressure gauge 13, which is already present in the control electronic for detecting a leakage in the area of the second fuel pipe 12, can be carried out in the control electronic.

The control electronic can consider additional parameters, as for example operating parameters of the combustion engine 20, besides the determined maximum pressure in the first pressure course 32 or in the second pressure course 50 for determining the opening pressure of the injection check valve 11. Thus the exhaust gas pressure that exists at the diagnosis point of time goes directly into the actuating pressure 30, at which the injection check valve 11 opens, and can be considered correspondingly.

The opening pressure of the injection check valve 11 influences the fuel quantity that is supplied to the exhaust gas duct 25. The described procedure and the related device allow to measure the opening pressure of the injection check valve 11 that is build into the metering device 10 and to consider it at the calculation of the fuel quantity that is supplied to the exhaust gas duct 25. Therefore injection check valves 11 with a higher tolerance of the opening pressure can be used, which causes a more inexpensive manufacturing of the injection check valves 11.

The determined opening pressure of the injection check valve 11 can furthermore be compared with threshold values, which are not achieved or exceeded at certain errors of the injection check valve.

Thus an injection check valve 11 that jams in closed state causes that the pressure of the fuel increases over a value that is preset as threshold value in the second fuel pipe 12 before the injection check valve 11 during the diagnosis cycle for determining the opening pressure of the injection check valve 11. The defect injection check valve 11 can thus be detected and for example be displayed in the range of an on-board diagnosis.

An injection check valve 11 that jams in opened state causes like a leakage in the area of the second fuel pipe 12 that the pressure of the fuel does not achieve a preset threshold value. The default of a lower threshold value prevents that a maximum is evaluated incorrectly as opening pressure of the injection check valve 11 in the pressure courses 32, 50, which is caused by a leakage in the second fuel pipe 12 or a jammed injection check valve 11, and correspondingly used at the quantity calculation of the fuel that is supplied to the exhaust gas duct 25. An error message can also take place here in the range of an on-board diagnosis.

The procedure and the related device enable therefore to improve the metering accuracy of metering devices 10 for the metering of fuel into the exhaust gas duct 25 of combustion engines 20 and to detect an erroneous injection check valve 11 or a leakage in the second fuel pipe 12.

The invention claimed is:

1. A method of controlling a metering device for metering fuel into an exhaust gas duct of a combustion engine for regenerating a particle filter, wherein the metering device supplies the fuel to the exhaust gas duct over a security valve, a first fuel pipe, a metering valve, a second fuel pipe, and an injection check valve, the method comprising:
   actuating the metering valve;
   measuring a fuel pressure between the metering valve and the injection check valve in the second fuel pipe;
   recording the fuel pressure over time;

determining an opening pressure of the injection check valve using the recorded fuel pressure between the metering valve and the injection check valve;

comparing the fuel pressure to a first threshold value, wherein upon the pressure of the fuel exceeding the first threshold value, a defective injection check valve stuck in closed state is assumed; and comparing the fuel pressure to a second threshold value, wherein a defective injection check valve stuck in open state or a leakage is assumed if the fuel pressure is below the second threshold value, the second threshold value being lower than the first threshold value.

2. The method of claim 1, further comprising considering operating parameters of the combustion engine at the determination of the opening pressure of the injection check valve.

3. The method of claim 1, further comprising, upon determining the opening pressure of the injection check valve, alternatively opening the security valve and the metering valve at least until a first opening of the injection check valve so that the pressure of the fuel between the metering valve and the injection check valve increases stepwise, wherein the opening pressure of the injection check valve is assumed from the measured fuel pressure.

4. The method of claim 3, presetting a time between a closing of the security valve and an opening of the metering valve and a time between a closing metering valve and an opening of the security valve.

5. The method of claim 3, further comprising presetting a time between an opening and closing of the security valve and a time between an opening and closing of the metering valve.

6. The method of claim 1, further comprising, upon determining the opening pressure of the injection check valve, simultaneously opening the security valve and the metering valve, wherein the opening pressure of the injection check valve is assumed from a first maximum of the pressure of the fuel.

7. The method of claim 1, further comprising determining the opening pressure of the injection check valve during a regularly regenerating operation of the particle filter, a diagnose cycle, or a rinse operation of the metering device.

8. The method of claim 1, further comprising considering the opening pressure of the injection check valve by determining a quantity of the metering of the fuel with the aid of a pressure measurement between the security valve and the metering valve.

9. A device for determining an opening pressure of an injection check valve, comprising:

a control electronic having a computer-readable storage medium comprising program instructions;

wherein the injection check valve is a part of a metering device for supplying a fuel into an exhaust gas duct of a combustion engine for regenerating a particle filter, and wherein the fuel is supplied to the exhaust gas over a security valve, a first fuel pipe, a metering valve, a second fuel pipe, and the injection check valve, wherein a pressure gauge determines the fuel pressure in the second fuel pipe, and wherein the fuel pressure is recorded; and wherein the program instructions, when executed by the control electronic, causes the control electronic to:

control the metering device, wherein a tracker is provided in the control electronic to determine a maximum in the recorded fuel pressure in a pressure in the second fuel pipe;

compare the fuel pressure to a first threshold value, wherein upon the pressure of the fuel exceeding the first threshold value, a defective injection check valve stuck in closed state is assumed; and compare the fuel pressure to a second lower threshold value; wherein a defective injection check valve stuck in open state or a leakage is assumed if the fuel pressure is below the second threshold value, wherein the second threshold value is lower than the first threshold value.

10. The device of claim 9, wherein the program instructions, when executed by the control electronic, further causes the control electronic to implement an alternate opening and closing of the security valve and the metering valve, or a simultaneous opening of the security valve and the metering valve during a diagnosis cycle.

* * * * *